United States Patent [19]

Miura

[11] Patent Number: 5,696,597
[45] Date of Patent: Dec. 9, 1997

[54] DATA COMMUNICATION APPARATUS WITH DISPLAY OF PARALLEL OPERATION OF ON-LINE AND OFF-LINE MODES

[75] Inventor: Shigeo Miura, Tokyo, Japan

[73] Assignee: Canon Kabushiki Kaisha, Tokyo, Japan

[21] Appl. No.: 476,284

[22] Filed: Jun. 7, 1995

Related U.S. Application Data

[63] Continuation of Ser. No. 92,573, Jul. 16, 1993, abandoned, which is a continuation of Ser. No. 873,888, Apr. 24, 1992, abandoned, which is a continuation of Ser. No. 754,313, Sep. 4, 1991, abandoned, which is a continuation of Ser. No. 349,770, May 10, 1989, abandoned.

[30] Foreign Application Priority Data

May 11, 1988 [JP] Japan .................. 63-115767

[51] Int. Cl.$^6$ .................. H04N 1/00; H04N 1/32; G03G 21/00
[52] U.S. Cl. .................. 358/400; 358/468; 399/81
[58] Field of Search .................. 358/400, 402, 358/405, 407, 437, 442, 444, 468; 379/100; 355/202; 399/1, 2, 75, 81

[56] References Cited

U.S. PATENT DOCUMENTS

| | | | |
|---|---|---|---|
| 4,454,575 | 6/1984 | Bushaw | 358/468 |
| 4,754,335 | 6/1988 | Izawa | 379/100 |
| 4,811,385 | 3/1989 | Watanabe | 379/100 |
| 4,833,705 | 5/1989 | Kobayashi | 379/100 |
| 4,893,333 | 1/1990 | Baran | 358/468 |
| 4,896,223 | 1/1990 | Todome | 358/444 |
| 4,897,869 | 1/1990 | Takahashi | 379/100 |
| 4,930,017 | 5/1990 | Izawa | 358/468 |
| 4,932,048 | 6/1990 | Kenmochi et al. | 379/100 |
| 4,937,762 | 6/1990 | Todome | 358/468 |

*Primary Examiner*—Eric Frahm
*Attorney, Agent, or Firm*—Fitzpatrick, Cella, Harper & Scinto

[57] ABSTRACT

A data communication apparatus having an on-line mode and off-line mode and being capable of parallel operation of the on-line and off-line modes. The apparatus includes a display for displaying the operation state of the apparatus; a controller for controlling to selectively display the on-line operation state and off-line operation state on the display; a manual instruction unit for manually outputting a display change instruction to the controller; and an automatic instruction unit for automatically outputting the display change instruction to the controller; wherein the controller functions to perform display change in accordance with the display change instruction from the manual or automatic instruction unit.

46 Claims, 10 Drawing Sheets

DATA COMMUNICATION APPARATUS WITH DISPLAY OF PARALLEL OPERATION OF ON-LINE AND OFF-LINE MODES

This application is a continuation of application Ser. No. 08/092,573 filed on Jul. 16, 1993 now abandoned, which is a continuation of prior application Ser. No. 07/873,888 filed on Apr. 24, 1992 now abandoned, which is a continuation of prior application Ser. No. 07/754,313 filed on Sep. 4, 1991 now abandoned, which is a continuation of prior application Ser. No. 07/349,770 filed on May 10, 1989 now abandoned.

BACKGROUND OF THE INVENTION

1. Field of the Invention

The present invention relates to a data communication apparatus capable of on-line and off-line operations in parallel.

2. Related Background Art

As dual operation apparatus, there is known a facsimile apparatus which can execute in parallel both on-line operation such as a data communication operation and off-line operation such as a copy operation.

With such a facsimile apparatus, the contents of off-line and on-line operations are displayed either on two separate displays or on a single large display.

Such a conventional apparatus is associated with a problem that two separate displays or a single large display is required, resulting in a complicated display unit.

SUMMARY OF THE INVENTION

An object of the present invention is to provide an improved data communication apparatus eliminating the above-described problem.

Another object of the present invention is to make the display arrangement simple by selectively displaying the on-line operation state and off-line operation state.

A further object of the present invention is to preferentially display the off-line operation state and make it possible to switch a display of off-line operation state to a display of on-line operation state.

A still further object of the present invention is to allow a display normally displaying the off-line operation state to be switched to a display of on-line operation state upon instruction by an operator.

Another object of the present invention is to selectively display the on-line and off-line operation states on a single display, and allow an operator to select one of the on-line and off-line operation states as desired.

The above and other objects of the present invention will become apparent from the following detailed description when read in conjunction with the accompanying drawings.

DETAILED DESCRIPTION OF THE PREFERRED EMBODIMENTS

Embodiments of the present invention will be described in detail with reference to the accompanying drawings. In the following embodiments, a facsimile apparatus will be described by way of example.

Figure 1:
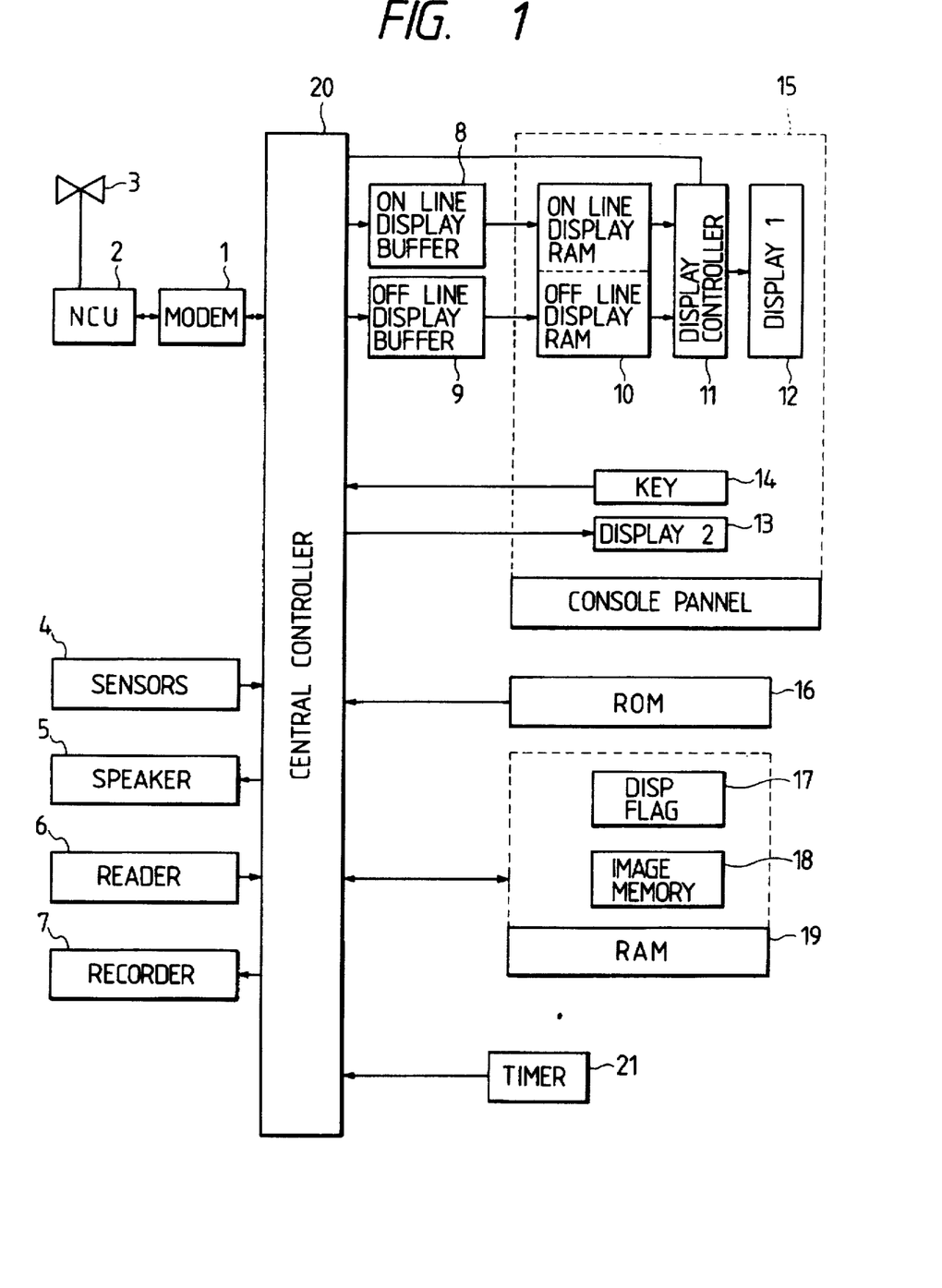
FIG. 1 is a block diagram showing the system arrangement of an embodiment of this invention.

FIG. 1 is a block diagram showing the system arrangement of an embodiment of a facsimile apparatus of this invention.

In FIG. 1, a modem 1 is used for communication (on-line operation). A network control unit (NCU) 2 controls a line to connect the line to a telephone set 3 or to the modem 1. Various sensors 4 detect the conditions of the apparatus. A loud speaker 5 generates an error sound, line monitor Sound or the like to notify an operator of the conditions of the apparatus. A reader 6 reads an original to be transmitted. A recorder 7 prints a received image, various reports or the like. An on-line display buffer 8 temporarily stores data regarding an on-line operation state in communication to be transferred and displayed on a display 1 (reference numeral 12). An off-line display buffer 9 temporarily stores data regarding an off-line operation state to be transferred and displayed on the display 1. A display RAM 10 is capable of storing data regarding both the on-line and off-line operation states. A display controller 11 is supervised by CPU 20 to control the display number one to display data regarding on-line or off-line operation state stored in the display RAM 10 on the display 1. A display 2 indicated by reference numeral 13 is constructed of LEDs or the like and capable of displaying specific information, e.g., an on-line busy signal (representative of under communication) irrespective of whether the display 1 displays either the on-line operation state or the off-line operation state. The function (or designation or indication) of each of various keys 14 can be changed in accordance with a display change key or with whether an on-line operation state or off-line operation state is displayed. An operation panel 15 includes the elements 10 to 14. A ROM 16 determines the operation of the apparatus. A display flag 17 has information regarding display. For example, the display flag 17 determines the function of the display change key, i.e., an on-line operation or off-line operation function. An image memory 18 stores image signals for memory transmission/reception and other signals. A RAM 19 includes the elements 17 and 18. A central controller 20 controls the elements 1 to 19. A timer 21 operates to interrupt the central controller 20 at a predetermined time interval.

Figure 2:
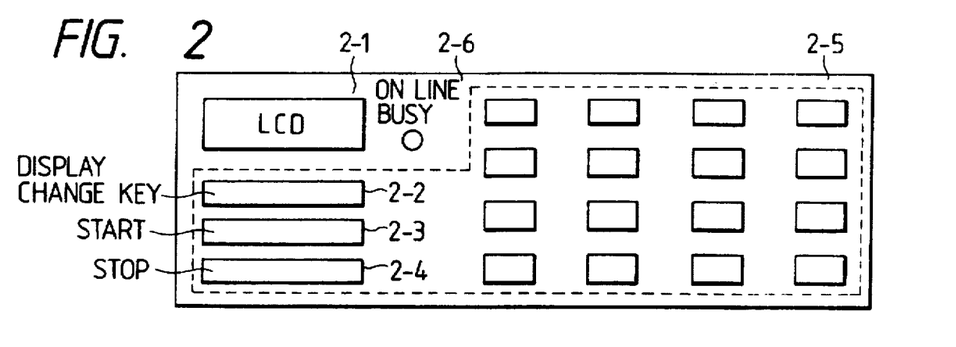
FIG. 2 is a plan view showing the operation panel of the embodiment.

FIG. 2 is a plan view of the operation panel of the embodiment shown in FIG. 1. In FIG. 2, a display 2-1 displays thereon the state of the facsimile apparatus and the displayed contents are changed to the on-line or the off-line in accordance with the display change key and the like. A display change key (monitor key) 2-2 is used to change the display contents on the display 2-1 from the on-line to the off-line, and at the same time change its function. A start key 2-3 is used to start the operation, the function thereof being changed in accordance with the on-line or off-line state. A stop key 2-4 is used to stop the operation, the function thereof being changed in accordance with the on-line or off-line state. Keys 2-5 include other keys as well as the keys 2-2 to 2-4. An on-line busy LED 2-6 displays specific information, i.e., on-line busy state irrespective of whether the display 2-1 displays thereon an on-line or off-line operation state.

Figure 3:
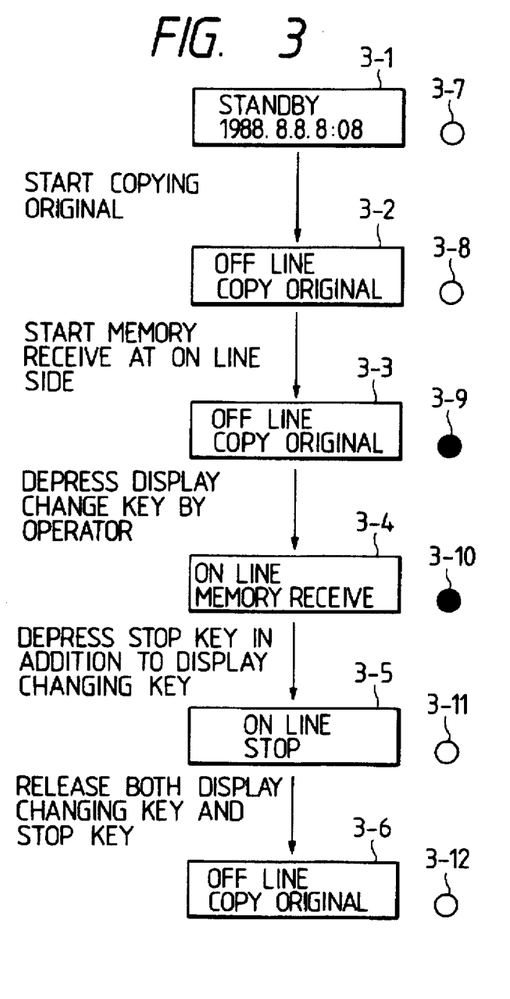
FIG. 3 illustrates a change of displays.

FIG. 3 illustrates a change of the display contents and the function of the keys from the off-line to the on-line, upon actuation of the display change key during the dual operation (parallel operation). In FIG. 3, 3-1 to 3-6 represent the display examples on the display 2-1 shown in FIG. 2, and 3-7 to 3-12 represent the display examples on the LED 2-6, respectively illustrating a stop of the on-line operation during the dual operation.

Figure 4:
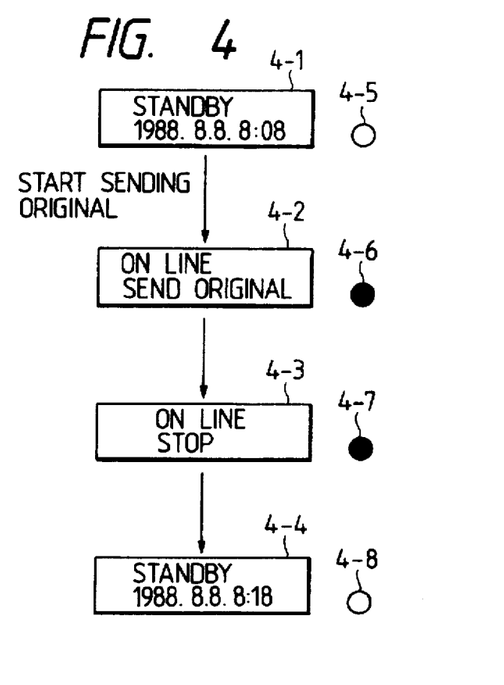
FIG. 4 illustrates a compulsory change of displays during sending an original.

FIG. 4 illustrates a compulsory change of the display contents and the function of the keys from the off-line to the on-line during original transmission. In FIG. 4, 4-1 to 4-4 represent the display examples on the display 2-1 shown in FIG. 2, and 4-5 to 4-7 represent the display examples on the LED 2-6, respectively illustrating a compulsory monitor mode during original transmission.

Figure 5:
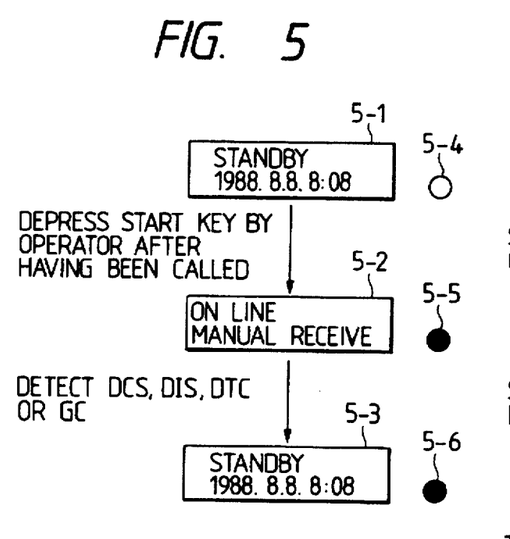
FIG. 5 illustrates a compulsory change of displays during manual reception.
Figure 6:
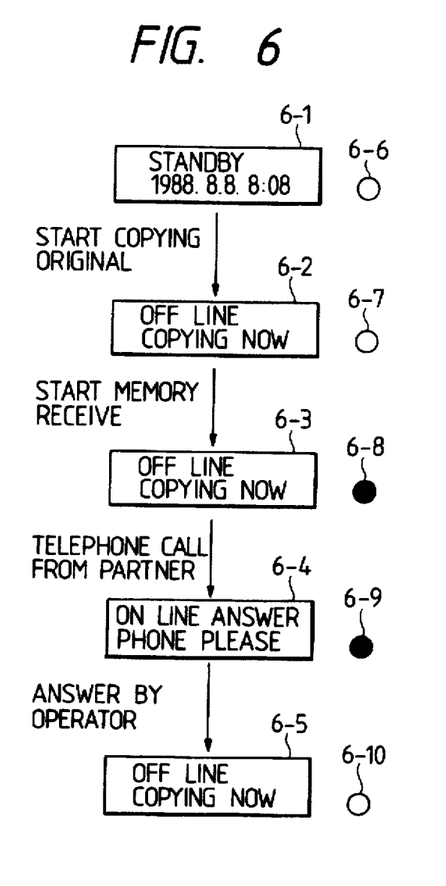
FIG. 6 illustrates a compulsory change of displays during one call.

FIG. 5 illustrates a compulsory change of the display contents and the function of the keys from the off-line to the on-line prior to execution of preprocess during manual reception (prior to reception of digital command signal DCS, digital identification signal DIS, digital transmission command DTC, or group command GC). In FIG. 5, 5-1 to 5-3 represent the display examples on the display 2-1 shown in FIG. 2, and 5-4 to 5-6 represent the display examples on the LED 2-6 respectively illustrating a compulsory monitor mode during manual reception. FIG. 6 illustrates a compulsory change of the display contents and the function of the keys from the off-line to the on-line, upon detection of a telephone call signal from a partner during the dual operation of the apparatus. In FIG. 6, 6-1 to 6-4 represent the display examples on the display 2-1 shown in FIG. 2, and 6-5 to 6-9 represent the display examples on the LED 2-6, respectively illustrating a detection of a telephone call signal from a partner during the dual operation.

The operation panel 15 shown in FIG. 1 corresponds to the panel shown in FIG. 2, the display 1 represented by reference numeral 12 corresponds to the display 2-1, and the display 2 represented by reference numeral 13 corresponds to the LED 2-6.

Figure 7:
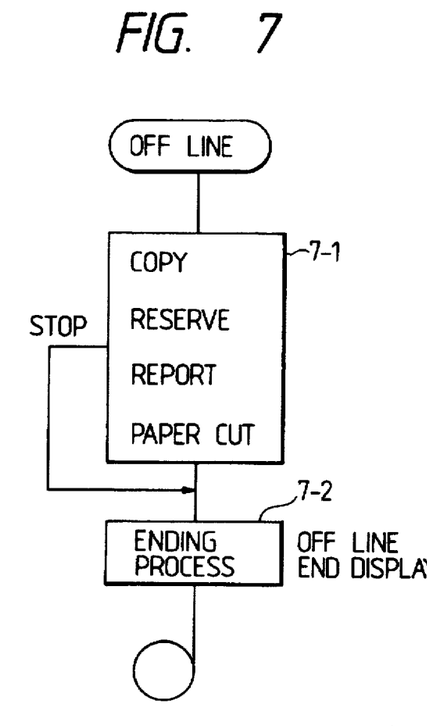
FIG. 7 is a flow chart illustrating an off-line operation.
Figure 8:
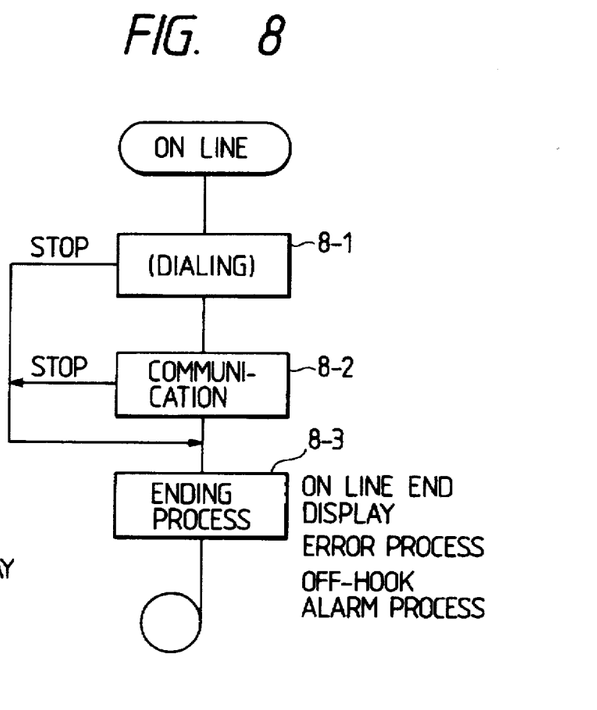
FIG. 8 is a flow chart illustrating an on-line operation.

While the facsimile apparatus shown in FIG. 1 and constructed as above is under the off-line and on-line dual operation, the central controller 20 executes in parallel the programs as explained in the flow charts shown in FIGS. 7 and 8.

The off-line operation performed at step 7-1 shown in FIG. 7 includes a copy, transmission reservation, communication management report output, paper feed and cut, and other operations. After completion of the off-line operation, an off-line end is displayed under control of the display controller 11.

The on-line operation performed in the flow chart shown in FIG. 8 includes an image communication operation of facsimile transmission/reception, and speech communication. At step 8-1 shown in FIG. 8, a dialing or a call signal from the line is detected. Upon detection, a communication operation is performed at step 8-2 and thereafter, an end process is carried out at step 8-3. The end process at step 8-3 includes an on-line end display process of displaying an on-line end under control of the display controller 11, an error process upon occurrence of communication error, an off-hook alarm process to notify an off-hook after communication, and other processes.

Figure 11:
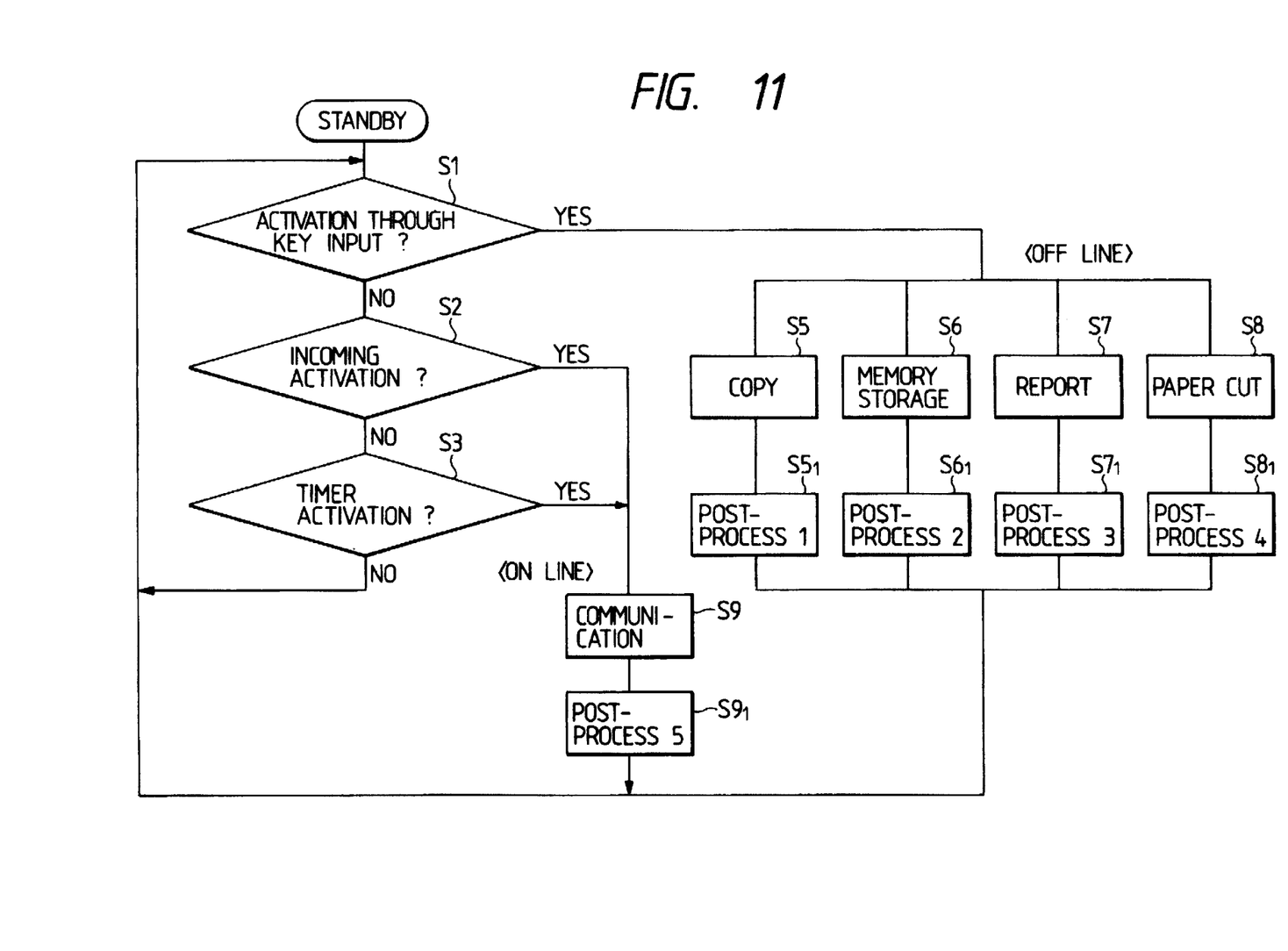
FIG. 11 is a system flow chart of the embodiment.

FIG. 11 is a system flow chart of the embodiment of this invention. Steps S1 to S3 constitute a stand-by loop for detecting any actuation of elements. At step 1, it is checked if there is a key input from the operation console. If present, a corresponding operation step S5 to S8 is performed. After the operation, the flow advances to the corresponding post-process S51 to S81 to release (or reset) the hardware, flag and the like used in the operation. Thereafter, the flow returns to the stand-by loop. At step S2, it is checked if there is an incoming actuation (call signal) from the telephone line. If present, the reception operation is performed. At step S3, it is checked if the reserved time for communication has come. If it is the reserved time, then communication operation is actuated. After completion of communication at step S9, the hardware, flag and the like associated with the communication line are reset at step S91.

Although the flow chart is shown as for a single task, the off-line operation at steps S5 to S81 and the on-line operation at steps S9 and S91 are executed in parallel as described with FIGS. 7 and 8.

Figure 12:
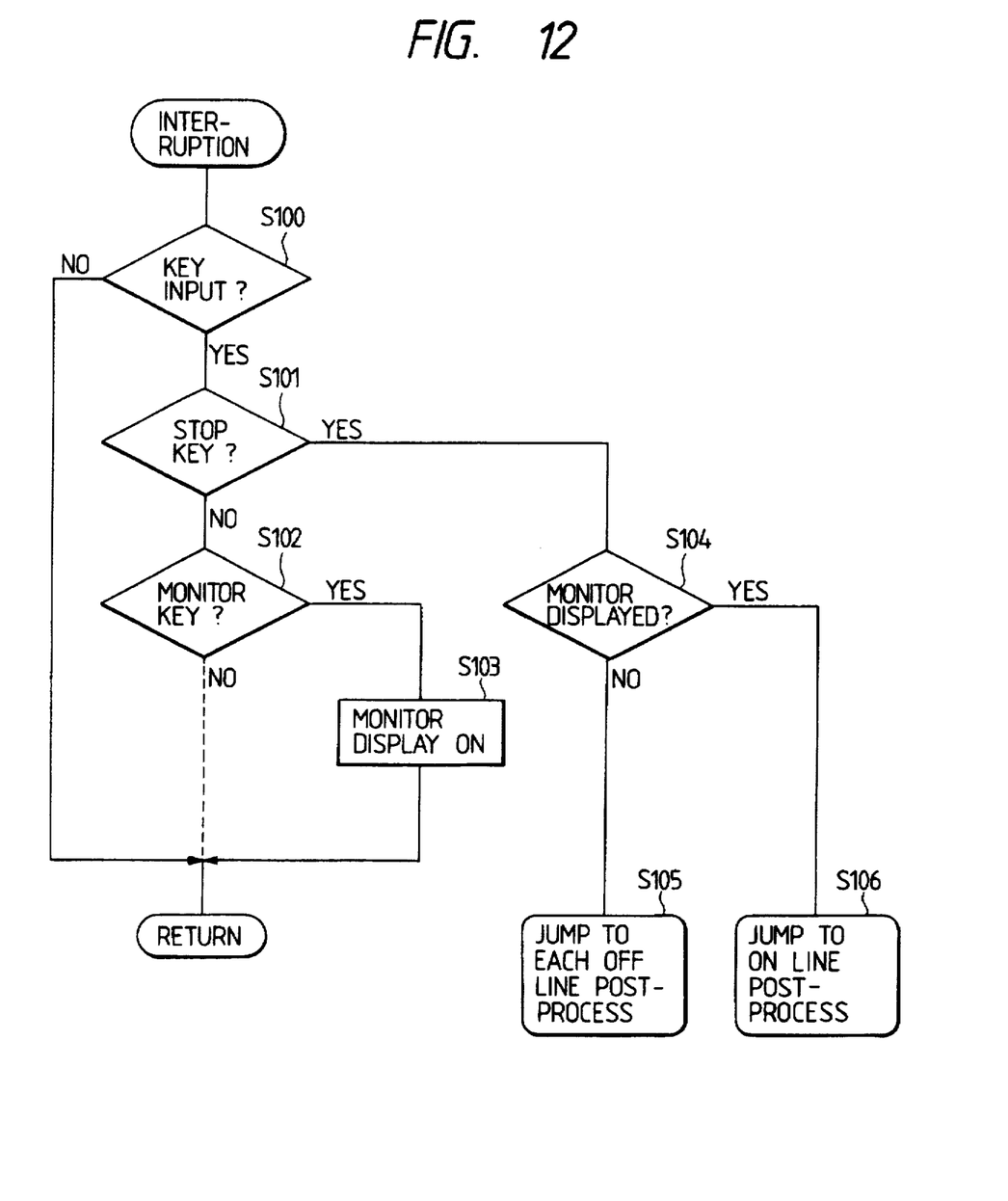
FIG. 12 is a flow chart illustrating an interruption for detecting a key input.

FIG. 12 is a flow chart illustrating an interruption routine which is periodically executed for detecting a key input.

At step S100, it is checked if there is any actuation of a key on the operation console. If not, the flow simply returns. If present, the actuated key is discriminated. At step S101, it is checked if the actuated key is a stop key. If affirmative, it is considered as the stop key for the on-line on condition that step S104 is now performing a display on the monitor. At step S106, the flow is caused to forcibly jump to the communication (on-line) post-process S91. If not at step S104, the actuated key is considered as the stop key for the off-line. At step S105, the flow is caused to forcibly jump to the off-line post processes S51 to S81 whereat a copy, report, or the like operation is performed.

At step S102, it is checked if the actuated key is the monitor key (display change key) used for monitor display. If it is the monitor key, at step S103 a monitor display for displaying the line side operation state is actuated.

During the on-line and off-line parallel operation, if the display change key 2-2 is not depressed and if it is not the compulsory monitor mode, the display contents on the display 2-1 and the function of the keys 2-5 are changed to the off-line as shown at 3-3 in FIG. 3. In this condition, if an operator depresses the display change key (monitor key) 2-2, the display contents of the LCD 2-1 and the function of the keys 2-5 are changed to the on-line as shown at 3-4 in FIG. 3. In this condition, if the operator depresses the stop key 2-4, the on-line operation is stopped. The LED 2-6 always displays specific information, i.e., on-line busy state as shown at 3-7 to 3-12 in FIG. 3 irrespective of the on-line or off-line of the LCD 2-1 and keys 2-5.

Figure 9:
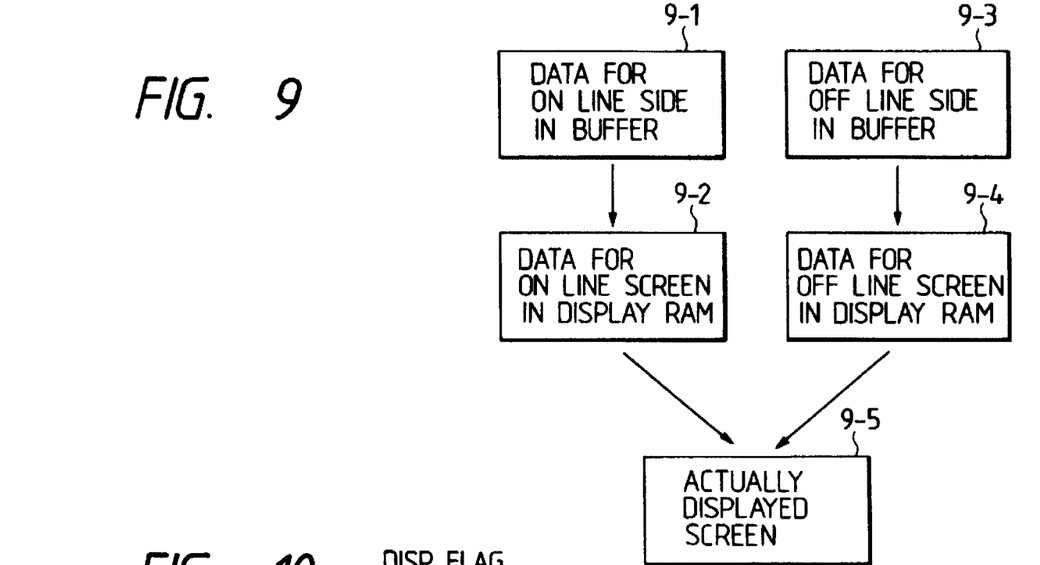
FIG. 9 illustrates a flow of display data.

According to the actual display data flow, the on-line and off-line data as shown in FIG. 9 is prepared in the respective display buffers 8 and 9 shown in FIG. 1 and transferred to the display RAM 10. The on-line or off-line data are selected under control of the display controller 11 upon an instruction from the central controller 20 to thus display the selected data on the LCD display 2-1.

Figure 10:
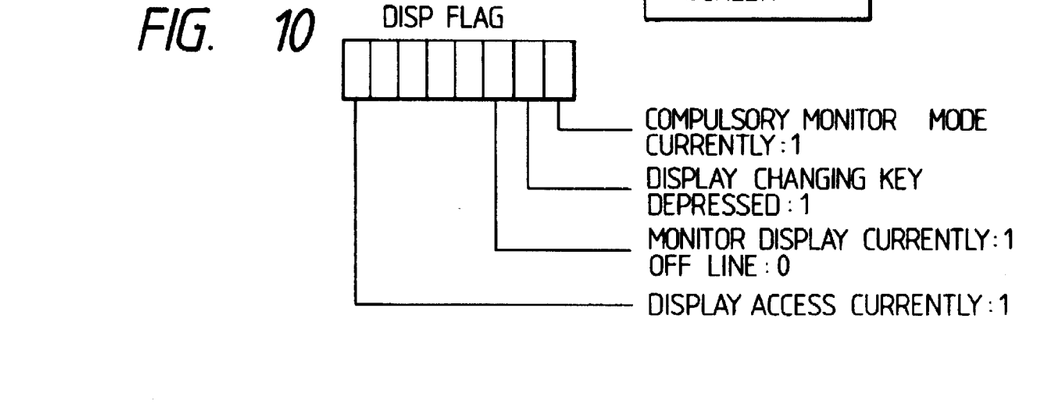
FIG. 10 shows a display flag 17.
Figure 13:
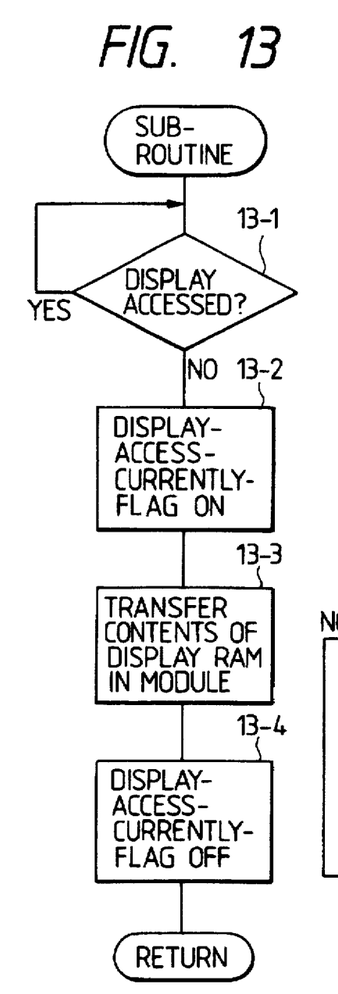
FIG. 13 is a flow chart illustrating a display change routine.
Figure 14:
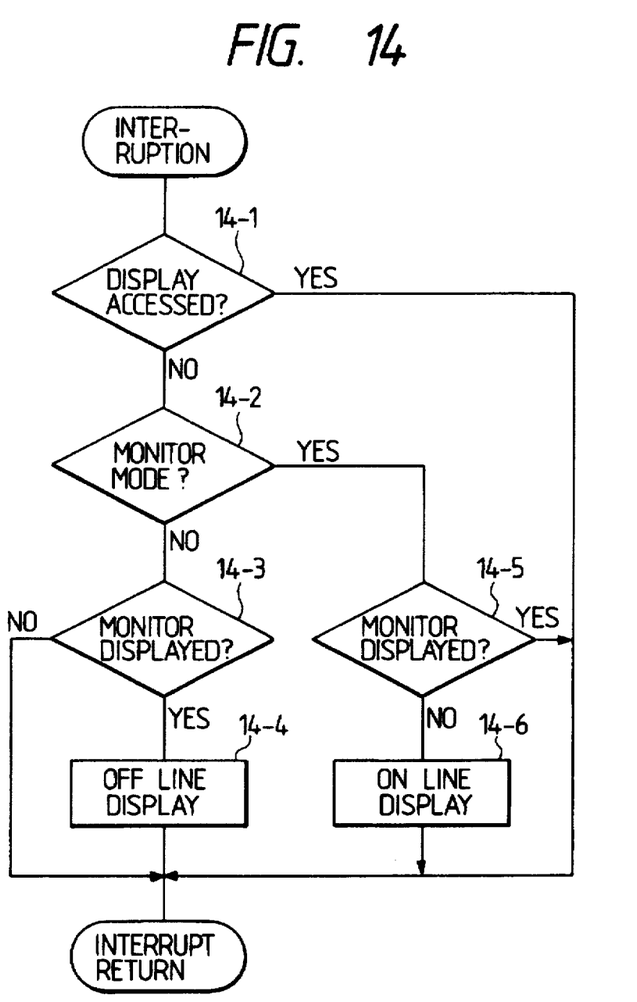
FIG. 14 is a flow chart illustrating an interruption routine for display change.

The actual display programs are constructed as shown in the flow charts of FIGS. 13 and 14. The central controller 20 shown in FIG. 1 discriminates the display flag 17 of FIG. 1 (which is detailed in FIG. 10) and changes the display contents on the display 12 shown in FIG. 1 (corresponding to the LCD display 2-1 in FIG. 2) and the function of the key 14 shown in FIG. 1 (corresponding to the keys 2-5 in FIG. 2) The contents of the display flag change with the display access state, display change key actuation state, and compulsory monitor mode operation state. If one or both of the compulsory monitor mode flag and the display change key depression flag are set, the monitor mode is actuated. In an actual case, the central controller 20 shown in FIG. 2 is interrupted at a predetermined time interval by means of the timer 21. Upon this timer interruption, the central controller 20 executes the programs illustrated in the form of the flow chart of FIG. 14, and changes the contents of the display flag in accordance with the monitored state. While discriminating the display flag, the display program illustrated as the flow chart of FIG. 13 is executed to thus determine the display contents of the display and the function of the keys. For instance, if the display change key is depressed under the condition that the display is on the off-line side and the monitor display flag is 0, the display change key depression flag within the display flag is set so that the operation is confirmed as not during the display access, and the display is changed to the on-line.

At step 13-1 shown in FIG. 13, it is checked if the access operation to the display is currently performed (i.e., it is checked if the display controller 11 is now accessing to the display). If not, the display-access-currently flag is turned on in step 13-2. Namely, the subroutine shown in FIG. 13 is actuated when the display change key (monitor key) 2-2 is turned on or the display is changed, e.g., during the compulsory monitor mode. Therefore, if the display change key is turned on before the display has been changed upon execution of the subroutine shown in FIG. 13, the next display change is carried out after the previous display change is completed.

Next, at step 13-3, the display pattern data are read from RAM 19 in accordance with the display flag and stored in the display buffer 8 or 9. After the data in the display buffer 8 or 9 are transferred to the display RAM 10, a display change command is sent to the display controller 11 which in turn changes the display contents on the display 12 to the display pattern supplied from the RAM 10. After completion of the display change, at step 13-4 the display-access-currently flag is turned off.

At step 14-1 shown in FIG. 14, it is checked based on the display-access-currently flag within the display flag 17 if the display is currently accessed. If during the display access operation, the flow returns from interruption. If not during the display access operation, it is checked at step 14-2 if the monitor mode is currently executed (when a change command to the on-line display is inputted from the key or upon communication reception). If during the monitor mode, it is checked at step 14-5 if the operation is during the monitor display (on-line display). If not, the on-line display is effected.

If not during the monitor mode at step 14-2, it is checked at step 14-3 if the operation is during the monitor display. If during the monitor display, the off-line display is effected and the flow returns from interruption.

Figure 15:
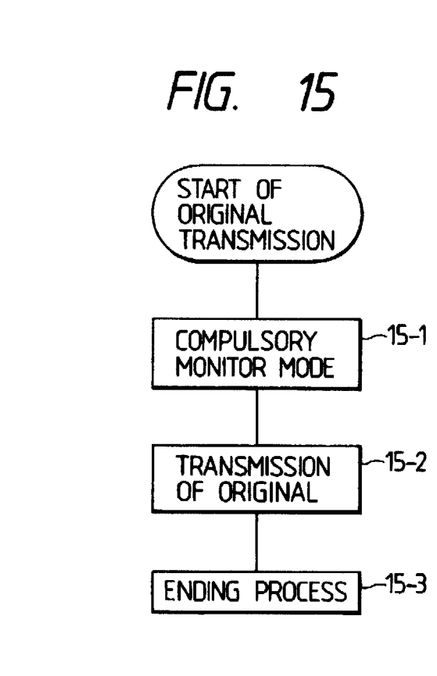
FIG. 15 is a flow chart illustrating an original transmission.

During an original transmission operation of the apparatus, the function of the display change key is changed to the compulsory monitor mode as shown in FIG. 4 in accordance with the flow chart of FIG. 15.

At step 15-1, the operation is changed to the compulsory monitor mode whereat the display 12 is forcibly changed to the on-line similar to the case where the display change key 2-2 is depressed, and the compulsory monitor mode flag within the display flag 17 is turned on (set at "1"). At step 15-2, an original transmission process is executed. After completion of the transmission process, the line is released, the compulsory monitor mode is released, and the compulsory monitor flag is turned off, respectively at step 15-3.

Figure 16:
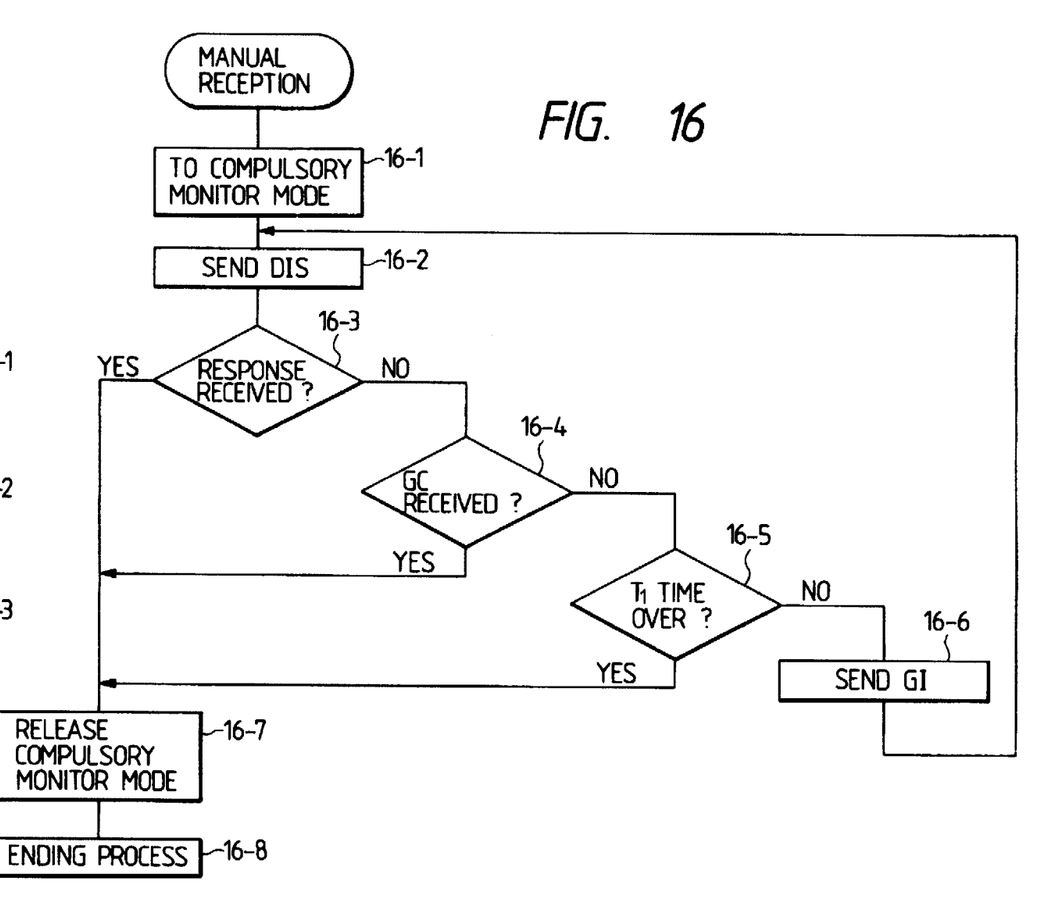
FIG. 16 is a flow chart illustrating a manual reception.

During the manual reception of the apparatus, the function of the display change key is forcibly changed to the monitor mode as shown in FIG. 15 in accordance with the flow chart of FIG. 16.

At step 16-1, in response to the actuation of manual reception (turning-on of the start key), the operation changes to the compulsory monitor mode. Then, the operation is forcibly changed to the on-line similar to the case shown in FIG. 15, and the compulsory monitor flag within the display flag 17 is turned on.

Next, at step 16-2, a digital identification signal DIS which is a procedure signal of G3 facsimile communication procedure conforming with CCITT Recommendations is transmitted.

At step 16-3, it is checked if a digital command signal DCS has been received or not. A signal DCS is a response signal to DIS. At step 16-4, it is checked if a group command signal GC has been received or not. A signal GC is a response signal to a group identification signal GI. A signal GI is a procedure signal of G2 facsimile communication procedure and is transmitted at step 16-6 after DIS. At step 16-5, it is checked if a timer T1 becomes time over while the response signal is not still received (i.e., if the response signal is received before time T1). If DCS is received at step 16-3, GC at step 16-4, and time over of timer T1 at step 16-5, then the flow advances to step 16-7 whereat the compulsory monitor mode is released and the display is changed to the off-line to execute the reception process. After completion of the reception process, an end process is executed at step 16-8.

Figure 17:
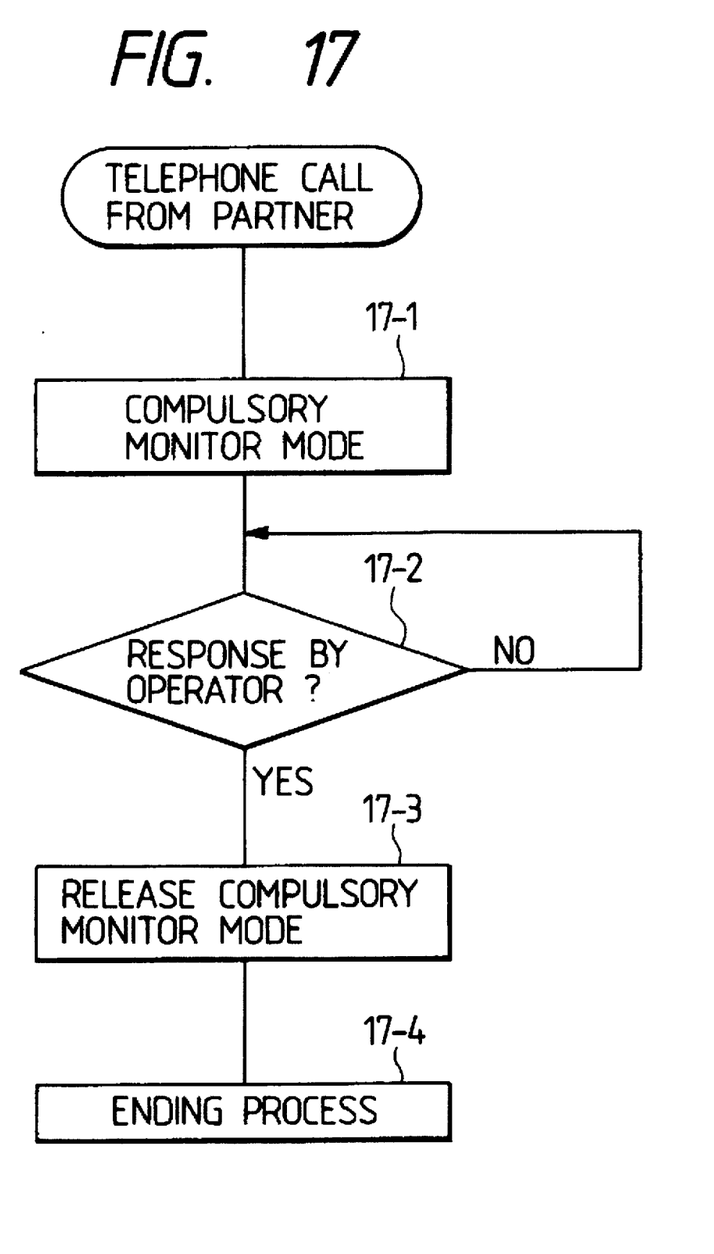
FIG. 17 flow chart illustrating a telephone call.

During a facsimile communication of the apparatus, if a telephone call signal is detected, the function of the display change key is changed to the compulsory monitor mode until an operator responds to the call, as shown in FIG. 6 in accordance with the flow chart shown in FIG. 17.

Upon reception of a telephone call signal (an operator call signal) during a facsimile communication, the program as shown in the flow chart of FIG. 17 is actuated. At step 17-1, the operation is changed to the compulsory monitor mode whereat the display is forcibly changed to the on-line and the compulsory monitor flag within the display flag 17 is turned on. Next, at step 17-2, it is checked if an operator has depressed the display change key to the telephone mode. If the display change key has been depressed, at step 17-3 the compulsory monitor mode is released and the display is changed to the off-line. At step 17-4, the line is changed from the facsimile (modem side) to the telephone set 3.

If an original to be transmitted is set on the apparatus which is under a stand-by state, then the function of the display change key is set at the off-line. When the telephone set becomes off-hook and the start key is depressed, the line is changed to the modem via which the facsimile communication procedure signal and image signals are sent to the partner to thus conduct a transmission process.

If the function of the display change key is set at the off-line during the stand-by state and the telephone set is off-hook, and when the start key is depressed after depression of a key for sending a selection signal, the transmission process is initiated. Then, the line is changed to the modem, and after the selection signal is sent, the procedure signal and image signals are sent to the partner via the modem.

The manual reception is initiated when the apparatus is set at the manual reception mode and the start key is depressed after the telephone set is made off-hook upon reception of a call signal from the line during the stand-by state.

The telephone call signal from a partner is a procedure interception negative PIN or a procedure interception positive PIP from the partner during G3 facsimile transmission, a procedure interception signal PRI-Q (where Q if EOM, EOP or MPS) from the partner during G3 facsimile reception, and a procedure interception signal PIS from the partner during G2 facsimile transmission/reception.

In FIGS. 3 to 6, the display examples of "on-line" and "off-line" have been used. However, more particular display examples may be used such as "reception" and "transmission" for the on-line display, and "copy" for the off-line display.

As described so far, according to the embodiment of this invention, a display change key is provided such that the on-line and off-line operation states are selectively displayed on a single display in accordance with the depression state of the key. The function of keys is made changeable in accordance with the display change conditions. Therefore, the apparatus can be made compact, low cost and inexpensive. In addition, an erroneous operation can be prevented.

Further, the display change key may be made as level sensitive so that the display contents and the function of keys are changed to the on-line while the display change key is being depressed. For instance, if a communication is intended to be intercepted, a depression of only the stop key does not intercept the communication, but a depression of the stop key while the display change key is being depressed can intercept the communication. Therefore, the intention of the operator such as communication interception or other operation changes is confirmed reliably so that erroneous communication interception and the resultant disturbance on the operator, partner and partner apparatus can be avoided to a large degree.

If an original transmission is required while the on-line operation is not being carried out, the display contents and the function of the key are forcibly changed to the on-line. Whereas on the other hand, if the apparatus is in communication, an operator causes the data of an original to be temporarily stored in a memory, and when the line becomes empty, the stored data are transmitted to thus conduct a so-called reserved transmission.

With the above arrangement, an operator is free from an unnecessary operation of temporary storage of an original during an empty state of the line.

Further, the LED display of simple structure is provided which displays specific information, i.e., an on-line busy state irrespective of the on-line or off-line operation. Therefore, important information is preferentially notified to an operator.

Furthermore, for a case where an operator has to respond quickly such as to a telephone call from a partner, the function of the display change key is forcibly changed to the on-line. Therefore, the operator is urged to respond quickly. For example, during the manual reception, the operation is forcibly set first to the on-line to make easy to carry out a rapid stop in accordance with the operator's intention or the like. After the reception mode is actuated upon key operation by the operator, the off-line mode is not immediately allowed, but the off-line mode is actuated after confirmation of reception of DCS, DTC, DIS or GC. Therefore, the operator feels easy upon confirming that the normal initial procedure has been correctly performed and the operation proceeds to the image signal communication. Thus, the operator can conduct smoothly the following off-line operation.

The invention is not limited to the above embodiment, but various modifications are possible. Further, although facsimile apparatus has been used in the above embodiment, the present invention is also applicable to other data communication apparatus such as telex, tele-telex and the like. In such a case, the on-line operation is performed with coded data.

I claim:

1. A data communication method operative in a data communication apparatus having an on-line mode and an off-line mode and being capable of parallel operation of the on-line and off-line modes, said method comprising the steps of:

changeably displaying, on first display means, an on-line operation state and an off-line operation state of the apparatus;

displaying, on second display means, whether the data communication apparatus is engaged in on-line communication regardless of whether the first display means displays the on-line or the off-line operation state;

changing a display of the first display means using first key input means; and responsive to a key input of the first key input means, controlling to selectively display an on-line operation state and an off-line operation state on the first display means.

2. A data communication method according to claim 1, further comprising operating the apparatus in accordance with second key input means, wherein a function of the second key input means is changed in accordance with the selected display of said on-line operation state and said off-line operation state.

3. A data communication method according to claim 1, wherein said control step controls to display said on-line operation state on the first display means while the first key input means is depressed, and to display said off-line operation state on the first display means while the first key input means is not depressed.

4. A data communication method according to claim 1, wherein said control step functions to forcibly change the operation to said on-line operation state display in response to data communication.

5. A data communication method according to claim 4, wherein said control means functions to forcibly change the operation to said on-line operation state display upon reception of a predetermined communication procedure signal for establishing data communication.

6. A data communication method according to claim 5, wherein said predetermined communication procedure signal is a procedure signal indicative of a telephone call request.

7. A data communication method according to claim 1, wherein said control step functions to change the operation from said on-line operation state display to said off-line operation state display.

8. A data communication method operative in a data communication apparatus having an on-line mode and an off-line mode and being capable of parallel operation of the on-line and off-line modes, said method comprising the steps of:

displaying, on first display means, an on-line operation state and an off-line operation state of the apparatus;

displaying, on second display means, that the data communicating apparatus is engaged in on-line communication while the first display means displays the off-line operation state;

changing a display of the first display means using first key input means; and responsive to a key input of the first key input means, controlling to selectively display an on-line operation state and an off-line operation state on the first display means.

9. A data communication method according to claim 8, further comprising operating the apparatus using second key input means, wherein a function of the second key input means is changed in accordance with the selected display of said on-line operation state and said off-line operation state.

10. A data communication method according to claim 8, wherein said control step controls to display said on-line operation state on the first display means while the first key input means is depressed, and to display said off-line operation state on the first display means while the first key input means is not depressed.

11. A data communication method according to claim 8, wherein said control step functions to forcibly change the operation to said on-line operation state display in response to data communication.

12. A data communication method according to claim 11, wherein said control step functions to forcibly change the operation to said on-line operation state display upon reception of a predetermined communication procedure signal for establishing data communication.

13. A data communication method according to claim 12, wherein said predetermined communication procedure signal is a procedure signal indicative of a telephone call request.

14. A data communication method according to claim 8, wherein said control step functions to change the operation from said on-line operation state display to said off-line operation state display.

15. A data communication apparatus having an on-line mode and an off-line mode and being capable of parallel operation of the on-line and off-line modes, comprising:

first display means for changeably displaying an on-line operation state and an off-line operation state of the apparatus;

second display means for displaying whether the data communication apparatus is engaged in on-line communication regardless of whether said first display means displays the on-line or the off-line operation state;

first key input means for changing a display of said first display means; and control means responsive to a key input of said first key input means for controlling to selectively display an on-line operation state and an off-line operation state on said first display means.

16. A data communication apparatus according to claim 15, further comprising second key input means for operating the apparatus, wherein a function of said second key input means is changed in accordance with the selected display of said on-line operation state and said off-line operation state.

17. A data communication apparatus according to claim 15, wherein said control means controls to display said on-line operation state on said first display means while said first key input means is depressed, and to display said off-line operation state on said first display means while said first key input means is not depressed.

18. A data communication apparatus according to claim 15, wherein said control means functions to forcibly change the operation to said on-line operation state display in response to data communication.

19. A data communication apparatus according to claim 18, wherein said control means functions to forcibly change the operation to said on-line operation state display upon reception of a predetermined communication procedure signal for establishing data communication.

20. A data communication apparatus according to claim 19, wherein said predetermined communication procedure signal is a procedure signal indicative of a telephone call request.

21. A data communication apparatus according to claim 15, wherein said control means functions to change the operation from said on-line operation state display to said off-line operation state display.

22. A data communication apparatus having an on-line mode and an off-line mode and being capable of parallel operation of the on-line and off-line modes, comprising:

first display means for changeably displaying an on-line operation state and an off-line operation state of the apparatus;

second display means for displaying whether the data communication apparatus is engaged in on-line communication regardless of whether said first display means displays the on-line or the off-line operation state;

first key input means for changing a display of said first display means;

second key input means for causing the apparatus to operate; and control means responsive to a key input of said first key input means for controlling to selectively display an on-line operation state and an off-line operation state on said first display means;

wherein said control means changes a function of said second key input means in accordance with said selected display.

23. A data communication apparatus according to claim 22, wherein said second key input means comprises a plurality of keys, and said control means changes a function of at least some of said plurality of keys.

24. A data communication apparatus according to claim 23, wherein said at least some keys include a start key for initiating various operations of the apparatus.

25. A data communication apparatus according to claim 24, wherein when the operation is changed to said on-line operation state display, said control means causes initiation of the operation of said on-line mode in response to an input from said start key, whereas when the operation is changed to said off-line operation state display, said control means causes initiation of the operation of said off-line mode in response to an input from said start key.

26. A data communication apparatus according to claim 23, wherein said at least some keys include a stop key for stopping various operations of the apparatus.

27. A data communication apparatus according to claim 26, wherein when the operation is changed to said on-line operation state display, said control means causes stopping of the operation of said on-line mode in response to an input from said stop key, whereas when the operation is changed to said off-line operation state display, said control means causes stopping of said off-line mode in response to an input from said stop key.

28. A data communication apparatus having an on-line mode and an off-line mode and being capable of parallel operation of the on-line and off-line modes, comprising:

first display means for changeably displaying an on-line operation state and an off-line operation state of the apparatus;

second display means for displaying whether the data communication apparatus is engaged in on-line communication regardless of whether said first display means displays the on-line or the off-line operation state;

control means for controlling to selectively display an on-line operation state and an off-line operation state on said first display means;

manual instruction means for manually outputting a display change instruction to said control means; and automatic instruction means for automatically outputting said display change instruction to said control means;

wherein said control means functions to perform display change in accordance with said display change instruction from said manual or automatic instruction means.

29. A data communication apparatus having an on-line mode and an off-line mode, and being capable of parallel operation of the on-line and off-line modes, comprising:

first display means for changeably displaying an on-line operation state and an off-line operation state of the apparatus;

second display means for displaying whether the data communication apparatus is engaged in on-line communication regardless of whether said first display means displays the on-line or the off-line operation state;

key input means for changing a display; and control means for controlling to selectively display an on-line operation state and an off-line operation state on said first display means, wherein said control means controls to display the on-line operation state on said first display means while said key input means is depressed, and to display the off-line operation state on said first display means while said key input means is not depressed.

30. A data communication apparatus according to claim 29, wherein said control means changes a display of the on-line operation state to a display of the off-line operation state in a predetermined time period after said key input means changes from a depressed state into a non-depressed state.

31. A data communication apparatus having an on-line mode and an off-line mode and being capable of parallel operation of the on-line and off-line modes, comprising:

first display means for displaying an on-line operation state and an off-line operation state of the apparatus;

second display means for displaying that the data communicating apparatus is engaged in on-line communication while said first display means displays the off-line operation state;

first key input means for changing a display of said first display means; and control means responsive to a key input of said first key input means for controlling to selectively display an on-line operation state and an off-line operation state on said first display means.

32. A data communication apparatus according to claim 31, further comprising second key input means for operating the apparatus, wherein a function of said second key input means is changed in accordance with the selected display of said on-line operation state and said off-line operation state.

33. A data communication apparatus according to claim 31, wherein said control means controls to display said on-line operation state on said first display means while said first key input means is depressed, and to display said off-line operation state on said first display means while said first key input means is not depressed.

34. A data communication apparatus according to claim 31, wherein said control means functions to forcibly change the operation to said on-line operation state display in response to data communication.

35. A data communication apparatus according to claim 34, wherein said control means functions to forcibly change the operation to said on-line operation state display upon reception of a predetermined communication procedure signal for establishing data communication.

36. A data communication apparatus according to claim 35, wherein said predetermined communication procedure signal is a procedure signal indicative of a telephone call request.

37. A data communication apparatus according to claim 31, wherein said control means functions to change the operation from said on-line operation state display to said off-line operation state display.

38. A data communication apparatus having an on-line mode and an off-line mode and being capable of parallel operation of the on-line and off-line modes, comprising:

first display means for changeably displaying an on-line operation state and an off-line operation state of the apparatus;

second display means for displaying that the data communication apparatus is engaged in on-line communication while said first display means displays the off-line operation state;

first key input means for changing a display of said first display means;

second key input means for causing the apparatus to operate; and control means responsive to a key input of said first key input means for controlling to selectively display an on-line operation state and an off-line operation state on said first display means, wherein said control means changes a function of said second key input means in accordance with said selected display.

39. A data communication apparatus according to claim 38, wherein said second key input means comprises a plurality of keys, and said control means changes a function of a least some of said plurality of keys.

40. A data communication apparatus according to claim 39, wherein said at least some keys include a start key for initiating various operations of the apparatus.

41. A data communication apparatus according to claim 40, wherein when the operation is changed to said on-line operation state display, said control means causes initiation of the operation of said on-line mode in response to an input from said start key, whereas when the operation is changed to said off-line operation state display, said control means causes initiation of the operation of said off-line mode in response to an input from said start key.

42. A data communication apparatus according to claim 38, wherein said at least some keys include a stop key for stopping various operations of the apparatus.

43. A data communication apparatus according to claim 43, wherein when the operation is changed to said on-line operation state display, said control means causes stopping of the operation of said on-line mode in response to an input from said stop key, whereas when the operation is changed to said off-line operation state display, said control means causes stopping of said off-line mode in response to an input from said stop key.

44. A data communication apparatus having an on-line mode and an off-line mode and being capable of parallel operation of the on-line and off-line modes, comprising:

first display means for changeably displaying an on-line operation state and an off-line operation state of the apparatus;

second display means for displaying that the data communication apparatus is engaged in on-line communication while said first display means displays the off-line operation state;

control means for controlling to selectively display an on-line operation state and an off-line operation state on said first display means;

manual instruction means for manually outputting a display change instruction to said control means; and automatic instruction means for automatically outputting said display change instruction to said control means;

wherein said control means functions to perform display change in accordance with said display change instruction from said manual or automatic instruction means.

45. A data communication apparatus having an on-line mode and an off-line mode, and being capable of parallel operation of the on-line and off-line modes, comprising:

first display means for changeably displaying an on-line operation state and an off-line operation state of the apparatus;

second display means for displaying that the data communication apparatus is engaged in on-line communication while said first display means displays the off-line operation state;

key input means for changing a display; and control means for controlling to selectively display an on-line operation state and an off-line operation state on said first display means, wherein said control means controls to display the on-line operation state on said first display means while said key input means is depressed, and to display the off-line operation state on said first display means while said key input means is not depressed.

46. A data communication apparatus according to claim 45, wherein said control means changes a display of the on-line operation state to a display of the off-line operation state in a predetermined time period after said key input means changes from a depressed state into a non-depressed state.

* * * * *